United States Patent
Brusarosco et al.

(10) Patent No.: US 7,313,952 B2
(45) Date of Patent: Jan. 1, 2008

(54) METHOD AND SYSTEM FOR MONITORING INSTANTANEOUS BEHAVIOR OF A TIRE IN A ROLLING CONDITION

(75) Inventors: Massimo Brusarosco, Milan (IT); Anna Paola Fioravanti, Milan (IT); Andrea Taldo, Milan (IT); Federico Mancosu, Milan (IT)

(73) Assignee: Pirelli Pneumatici S.p.A., Milan (IT)

( * ) Notice: Subject to any disclaimer, the term of this patent is extended or adjusted under 35 U.S.C. 154(b) by 187 days.

(21) Appl. No.: 10/508,829

(22) PCT Filed: Mar. 28, 2002

(86) PCT No.: PCT/EP02/03498

§ 371 (c)(1),
(2), (4) Date: May 11, 2005

(87) PCT Pub. No.: WO03/082643

PCT Pub. Date: Oct. 9, 2003

(65) Prior Publication Data

US 2005/0204806 A1    Sep. 22, 2005

(51) Int. Cl.
*G01M 17/02* (2006.01)
*G06F 15/00* (2006.01)

(52) U.S. Cl. .......................... 73/146; 702/181

(58) Field of Classification Search ............... 702/191, 702/181; 73/146; 303/167, 195
See application file for complete search history.

(56) References Cited

U.S. PATENT DOCUMENTS 3,532,393 A * 10/1970 Riordan ....................... 303/167
3,833,268 A * 9/1974 Fleagle ....................... 303/195
6,204,758 B1  3/2001 Wacker et al.
6,561,018 B2 * 5/2003 Mancosu et al. ............. 73/146

FOREIGN PATENT DOCUMENTS

| EP | 0 887 211 A1 | 12/1998 |
| WO | WO 98/56606 | 12/1998 |
| WO | WO 01/08908 A1 | 2/2001 |
| WO | WO 01/19653 A1 | 3/2001 |
| WO | WO 01/36241 A1 | 5/2001 |

* cited by examiner

*Primary Examiner*—John Barlow
*Assistant Examiner*—Victor J. Taylor
(74) *Attorney, Agent, or Firm*—Finnegan, Henderson, Farabow, Garrett & Dunner, L.L.P.

(57) ABSTRACT

A method for monitoring instantaneous behavior of a tire in a rolling condition includes acquiring and storing at least one reference curve representing an acceleration profile of at least one specified point of the tire as a function of its position during at least one portion of a revolution of the tire; continuously acquiring signals of acceleration of the at least one point; deriving from the signals of acceleration at least one cyclic curve of acceleration of the at least one point; comparing the at least one cyclic curve with the at least one reference curve; and emitting a signal depending on the comparison that indicates the instantaneous behavior of the tire. The at least one reference curve represents the acceleration profile in at least two directions, including two or more of a centripetal direction, a tangential direction, and a lateral direction. A related system and tire are also disclosed.

28 Claims, 5 Drawing Sheets

METHOD AND SYSTEM FOR MONITORING INSTANTANEOUS BEHAVIOR OF A TIRE IN A ROLLING CONDITION

CROSS-REFERENCE TO RELATED APPLICATIONS

This application is a national-phase entry under 35 U.S.C. § 371 from International Application No. PCT/EP02/03498, filed Mar. 28, 2002, in the European Patent Office, the content of which is relied upon and incorporated herein by reference.

BACKGROUND OF THE INVENTION

1. Field of the Invention

The present invention relates to a method and system for monitoring the instantaneous behaviour and interaction with the road of a tire during the running of a motor vehicle equipped with tires.

2. Description of the Related Art

A tire of a motor vehicle, when rolling on a road surface, is subject to a vertical load and to tangential and transverse external forces, which are generated in the various manoeuvres, such as braking, acceleration, cornering, straight line running etc.

During each manoeuvre, any point on the tire rolling in steady state and in transitory conditions carries out a movement, which can be represented by displacements in the three spatial directions, for each cycle of the revolution of the tyre. The movement of any points have characteristics which are typical of the position of each particular point of the structure, of the external profile of the tyre, of the conditions of use (speed, load and pressure), of the conditions of the surface on which the tyre rolls, and of the external forces to which the tyre is subjected in the manoeuvres of braking, acceleration, cornering, etc.

The patent application EP887211 describes a tire monitoring system for a tire on a vehicle comprising: a sensor device operatively arranged with respect to the tire to create an electrical pulse during the footprint pass corresponding to a deformation of the tire; means for calculating a ratio of the duration of said electrical pulse to the duration of one tire revolution; means for transmitting said ratio to an evaluating unit placed in the vehicle. Said sensor device is placed within the tread area of said tire in order that said electrical pulse presents a first maximum at the entrance and a second maximum at the leaving of said footprint pass.

The patent application WO0136241 in the name of the same applicant of present application describes a method for monitoring the instantaneous behaviour of a tyre during the running of a motor vehicle, comprising the steps of
acquiring and storing, at least temporarily, at least one basic reference curve which represents the variation of the displacement of at least one specified point of the said tyre in at least one spatial direction, as a function of the spatial position of the point, in at least one portion of a revolution of the tyre,
continuously acquiring signals of the position in space of the specified point of the tyre,
deriving from the position signals at least one cyclic curve of operating displacement of the point in the spatial direction, as a function of the spatial position of the point, in at least one portion of a revolution of the tyre,
continuously comparing the said curve of operating displacement with the said basic reference curve of displacement, and
emitting a signal depending on the comparison and indicating the instantaneous behaviour of the tyre.

The patent U.S. Pat. No. 6,204,758 describes a tire monitor for use in a remote tire monitor system including an accelerometer for detecting acceleration of the tire monitor. Location (relative to vehicle) information for the tire monitor is determined in response to the acceleration. In this manner, tire location (relative to the vehicle) information is determined automatically to allow the system to display tire characteristic data such as air pressure in conjunction with tire location (front right, front left).

SUMMARY OF THE INVENTION

The Applicant has observed that the deformations of a tire in a rolling condition occur in a plurality of directions with respect to a local reference frame. Said local reference frame is a reference on which the deformations are detected (e.g. an orthogonal axes system or a polar axes system). For example, a deformation of the tire due to a load variation on said tire is substantially a deformation in a centripetal direction, which is a radial direction of said tire. During a braking condition the deformations of the tire are mainly in a tangential direction, which is a direction tangential to the circumference of said tire and during a cornering condition the deformations of the tire are mainly in a lateral direction, which is a direction orthogonal to both said lateral and centripetal directions.

The Applicant has observed that the accelerations and their variation in a predetermined temporal interval of specific points of a tire, with respect to said local reference frame, are in relationship with said deformations of the tire, which are generated from the interactions between the tire in motion and the ground.

The Applicant has perceived that to monitoring the deformations of a tire in a rolling condition an acceleration profile in at least two directions of said local reference frame should be detect.

Moreover, the Applicant has tackled the problem of choosing characteristic points of the tire, on which measuring said acceleration profile as a function of the position of said points, having a relationship each other with respect to the global behaviour of the tire. Moreover, the applicant has tackled the problem of analysing measured curves of accelerations for said specific points for at least a complete rolling of the tire.

Moreover, the Applicant has observed that each of said specific points has a specific behaviour with respect to the interactions between the tire and the road.

The Applicant has found that, to monitor the deformations of a tire, the acceleration of a first characteristic point and the acceleration of a second characteristic point may be compared. In general to obtain a global indication of the behaviour of a tire more than one characteristic point of the tire has to be monitored. For each manoeuvre, which has to be monitored, there are characteristic points, which have a more direct correlation between said accelerations and the deformations of the tire than other points of the tire itself. The deformations of said chosen points are in relationship with the instantaneous behaviour of the tire and interaction between the road and the tire itself.

Moreover, the accelerations of a specific point on a rolling tyre, which is subject to specific forces, has the same basic shape (basic curve) for each revolution of the tyre, while it varies as to the position and amplitude of the peaks, and/or the start and end of each peak, and the relative maximum and/or minimum, and/or a "slope" of particular portions of the curve.

The Applicant has found that, to monitor the behaviour of a tire during the above-cited manoeuvres of a vehicle in motion, predetermined portion of said curves may be monitored. Said curves assume significant values in proximity (before and after) the passage of the monitored points into the physical contact between the tire and the road. Preferably, monitored portions of said curves may be associated with specific deformations corresponding to specific phenomena (e.g. aquaplaning phenomenon, a locked wheel etc . . . )

A first aspect of present invention is referred to a method for monitoring the instantaneous behaviour of a tyre in a rolling condition, comprising the steps of
a) acquiring and storing, at least temporarily, at least one reference curve which represents the acceleration profile of at least one specified point of the said tyre in at least two directions selected from a centripetal, a tangential and a lateral directions as a function of the position of the said point, in at least one portion of a revolution of the said tyre,
b) continuously acquiring signals of the acceleration in said at least two directions of said at least one point of the said tyre, in at least one portion of a revolution of the said tyre,
c) deriving from the said signals at least one cyclic curve of acceleration profile of the said at least one point in at least the said portion of a revolution of the said tyre,
d) comparing said at least one cyclic curve with the said at least one reference curve, and
e) emitting a signal depending on the said comparison, the said signal indicating the said instantaneous behaviour of the said tyre.

Preferably, said step of comparing comprises comparing said at least one reference curve and said at least one cyclic curve point by point for an entire revolution of the tire.

Preferably, said step of comparing comprises comparing a reference curve derived from a first point on the tire and a cyclic curve derived from a second point on the tire.

Preferably, said first point is located on the liner surface along the equatorial plane of the tire and said second point is located on the liner surface on a shoulder of said tire, said first and second points being located along the same meridian plane of the tire.

Preferably, said first point is located on the liner surface along the equatorial plane of the tire on a left shoulder of said tire and said second point is located on the liner surface on a right shoulder of said tire, said first and second points being located along the same meridian plane of the tire.

Preferably, said first point is located on the liner surface along the equatorial plane of the tire and the second point is located on the liner surface along the equatorial plane distant from said first point for a predetermined arc.

Preferably, said step of comparing comprises comparing characteristic peaks of said at least one reference curve with correspondents characteristic peaks of said at least one cyclic curve.

Preferably, said step of comparing comprises comparing a portion of the area under said at least one reference curve with the correspondent portion of the area under said at least one cyclic curve.

A further aspect of present invention is referred to a system for monitoring the instantaneous behaviour of a tyre in a rolling condition comprising:
i. at least one memory element for acquiring and storing, at least temporarily, at least one reference curve which represents the acceleration profile of at least one specified point of the said tyre in at least two directions selected from a centripetal, a tangential and a lateral directions in at least one portion of a revolution of the tyre,
ii. at least one sensor associated with the said at least one specified point of the said tyre, capable of emitting, over a period of time, signals of the acceleration in said directions of the said point,
iii. a receiving device capable of continuously acquiring the said signals of the acceleration of the said at least one point of the said tyre, in at least the said portion of a revolution of the said tyre, and
iv. an elaboration unit incorporating a program capable of determining from the said signals of acceleration at least one cyclic curve of acceleration of the said at least one point in the said directions in at least the said portion of a revolution of the said tyre,
v. said elaboration unit being capable of continuously comparing said at least one of cyclic curves of acceleration with said at least one stored reference curve,
vi. said elaboration unit being additionally capable of emitting a signal depending on the said comparison, the said signal indicating the said instantaneous behaviour of the said tyre.

Preferably, a first sensor is located on the liner surface along the equatorial plane of the tire and a second sensor is located on the liner surface on a shoulder of said tire, said first and second sensors being located along the same meridian plane of the tire.

Preferably, a first sensor is located on the liner surface along the equatorial plane of the tire on a left shoulder of said tire and a second sensor is located on the liner surface on a right shoulder of said tire, said first and second sensors being located along the same meridian plane of the tire.

Alternatively, a first sensor is located on the liner surface along the equatorial plane of the tire and a second sensor is located on the liner surface along the equatorial plane distant from said first sensor for a predetermined arc.

Preferably, said system further comprising a third sensor located on the liner surface along the equatorial plane of the tire distant from said second sensor for a predetermined arc.

Preferably, said first and second and third sensors are equidistant each other.

Preferably, a third sensor is located on the opposite shoulder of said second sensor along the same meridian plane of said first and second sensor.

Preferably, said system further comprises a speed sensor of said tire.

Preferably, said system further comprises a pressure sensor of said tire.

A further aspect of present invention is referred to a pneumatic tire comprising at least one sensor associated with at least one specified point of said tire, capable of emitting, over a period of time, a signal, which represents the acceleration profile of said at least one specified point, in at least two directions selected from a centripetal, a tangential and a lateral directions as a function of the position of the said point, in at least one portion of a revolution of the said tire.

BRIEF DESCRIPTION OF THE DRAWINGS

Characteristics and advantages of the invention will now be illustrated with reference to one embodiment represented in the attached figures, in which.

DETAILED DESCRIPTION OF THE EXEMPLARY EMBODIMENTS

Figure 1:
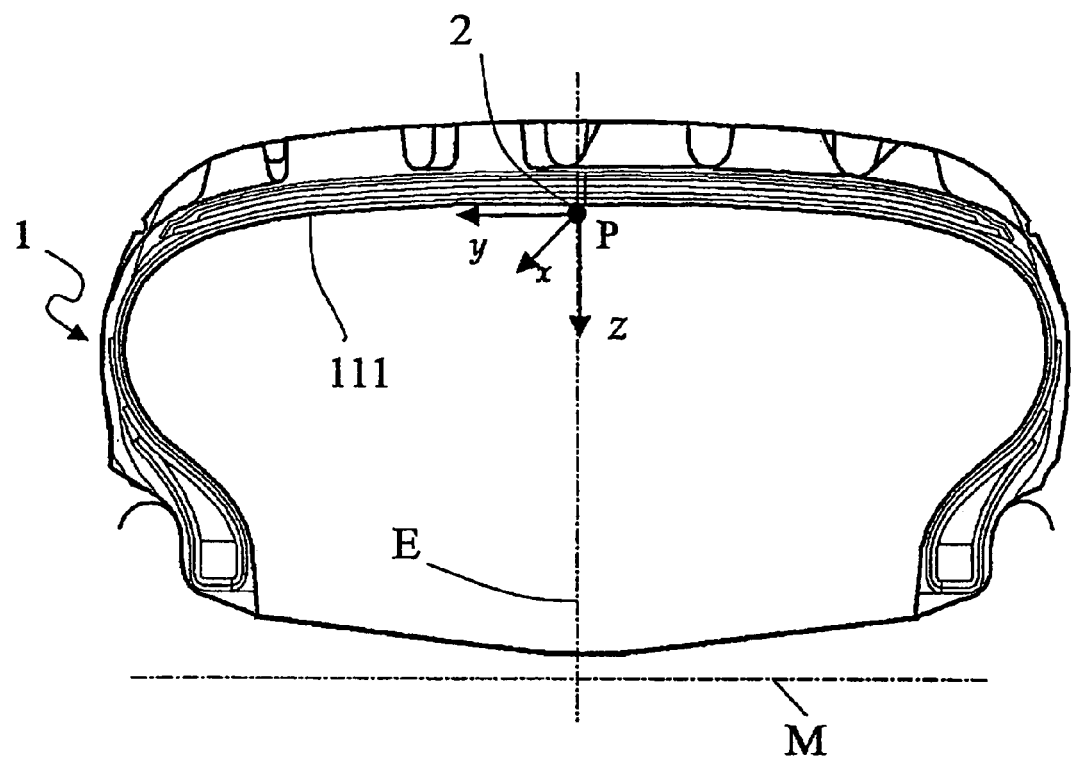
FIG. 1 shows schematically, in a section view, a rolling tyre having a sensor disposed on its internal surface, according to an embodiment of the present invention.

The tyre of FIG. 1 consists of an internally hollow toroidal structure formed by a plurality of components, and primarily by a textile or metallic carcass, having two beads and each formed along an inner circumferential edge of the carcass for securing the tyre to a corresponding supporting rim. The said carcass comprises at least one pair of annular reinforcing cores, called bead wires, which are inserted in the said beads.

The carcass comprises a supporting structure formed by at least a reinforcing ply which includes textile or metallic cords, extending axially from one bead to the other according to a toroidal profile, and which has each of its ends associated with a corresponding bead wire.

In tyres of the type known as "centripetal", the aforesaid cords lie essentially in planes containing the axis of rotation of the tyre.

On the crown of this carcass there is placed an annular structure, known as the belt structure, normally consisting of one or more strips of rubberized fabric, wound on top of each other to form what is called a "belt package", and a tread made from elastomeric material, wound around the belt package, and stamped with a relief pattern for the rolling contact of the tyre with the road. Two sidewalls, made from elastomeric material, each extending outwards in the centripetal direction from the outer edge of the corresponding bead, are also placed on the carcass, in lateral axially opposed positions.

In tyres of the type known as "tubeless", the inner surface of the carcass is normally covered with a "liner" layer, in other words one or more layers of airtight elastomeric material. Finally, the carcass may comprise other known elements, such as edges, strips and fillers, according to the specific design of the tyre.

It should be specified that, for purposes of the present description, the term "elastomeric material" indicates a material obtained by crosslinking a rubber composition comprising at least an elastomeric polymer having at least a filler dispersed therein and usually conventional additives such as curatives, processing aids, etc . . . .

The combination of all these elements determines the mechanical characteristics of elasticity, rigidity and resistance to deformation of the tyre, which constitute the connection between the system of forces applied to the tyre and the extent of the corresponding deformations which it undergoes.

One aspect of the present invention relates to the measurement of the variations of the acceleration of at least a specified point of a tire, in a predetermined temporal interval with respect to a local reference frame. Said local reference frame is a reference on which the acceleration values and directions are measured (i.e. a orthogonal axes system or a polar axes system).

Said variations are in relationship with the interactions between the tire in motion and the ground and are in relationship with the deformations of the tire itself during motion.

To this purpose at least a sensor, which is able to measure said acceleration, is associated to the tire.

Preferably, more than one sensor is associated to the tire and each sensor is disposed in a predetermined position of the tire. Preferably, said sensors are disposed on the internal surface of the tire and preferably in contact with said liner layer where such liner is present. Alternatively, one or more of said sensors may be inserted into the liner layer or into the tread band layer or into the carcass of the tire during the manufacturing process, i.e. into the beads. Moreover, the system of the present invention may provide a further sensor, which is able to measure the displacement of said point with respect to a local reference frame (i.e. optic).

In the embodiment of FIG. 1 a sensor 2 is associated to the tyre 1 and it is preferably disposed on the internal surface of the tire, in particular on the liner surface 111. More preferably, said sensor is disposed along the equatorial plan of said tire. For example said sensor is associated to said liner surface by means of a glue or a silicon sealant or an elastomeric compound liner compatible or similar.

Alternatively, said sensor is inserted into the liner layer or into the tread band layer, or inside the carcass or inside the bead during a tire manufacturing process.

Preferably, the sensors of present invention are accelerometers, which are able to measure the accelerations of the point of the tire on which they are associated with respect to a local reference frame.

In particular, in FIG. 1 the sensor 2 is able to measure the acceleration profile of the point P with respect to at least two directions selected from the x, y and z local axes. Said x, y and z local axes represent three direction that for the purpose of the present description are named respectively:

centripetal direction z which is a radial direction of said tire,
tangential direction y which is a direction tangential to the circumference of said tire,
lateral direction x which is a direction orthogonal to both said centripetal and tangential directions.

Then, said sensor 2 is able to measure the acceleration profile of the point P with respect to at least two directions selected from said centripetal direction, said tangential direction and said lateral direction.

Figure 2:
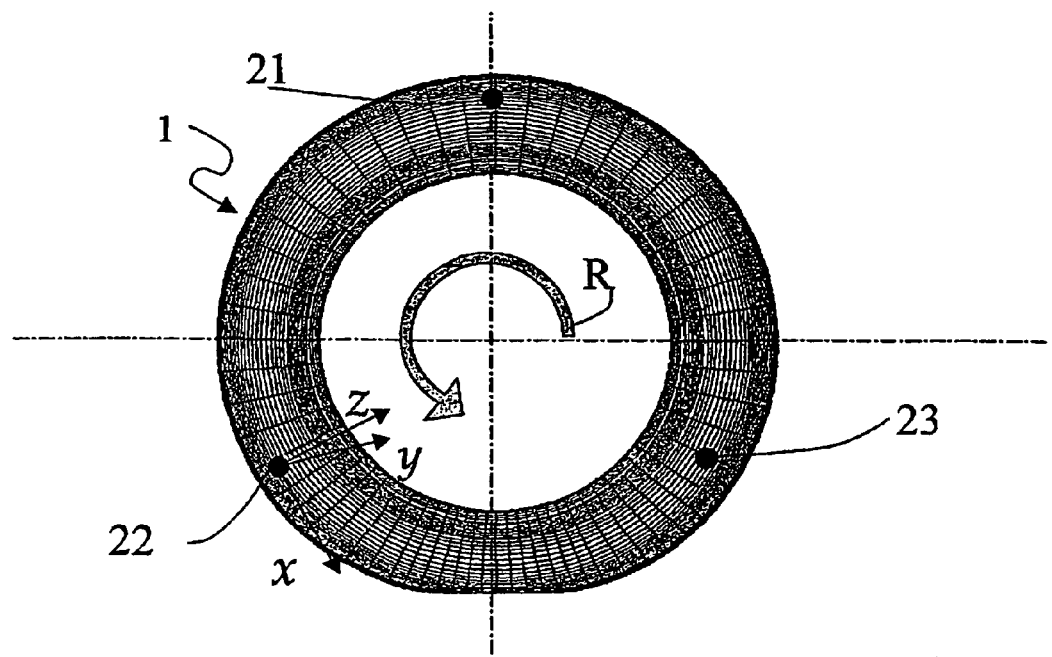
FIG. 2 shows schematically, in a side view, a rolling tyre having three sensors disposed on the liner internal surface, according to a further embodiment of the present invention.

In FIG. 2 a further embodiment of the present invention is shown. In such figure three sensors 21, 22, and 23 are associated to a tire 1. Preferably, the sensors are disposed in points on the inner surface of the tire. More preferably, said sensors are disposed in a central position, along an equatorial plane E of said tire and said sensors are equidistant each other. In particular said sensors are located in a circumferential position spaced one from the other of a predetermined arc.

This disposition gives more accuracy, reliability to know info in faster way in order to better monitor the entire wheel turn. For example, during a revolution of the tire it is possible to monitoring at the same time the acceleration during the footprint pass with a first sensor and the acceleration of a point located before the footprint pass with a second sensor and the acceleration of a point located after the footprint pass with a third sensor.

Figure 3:
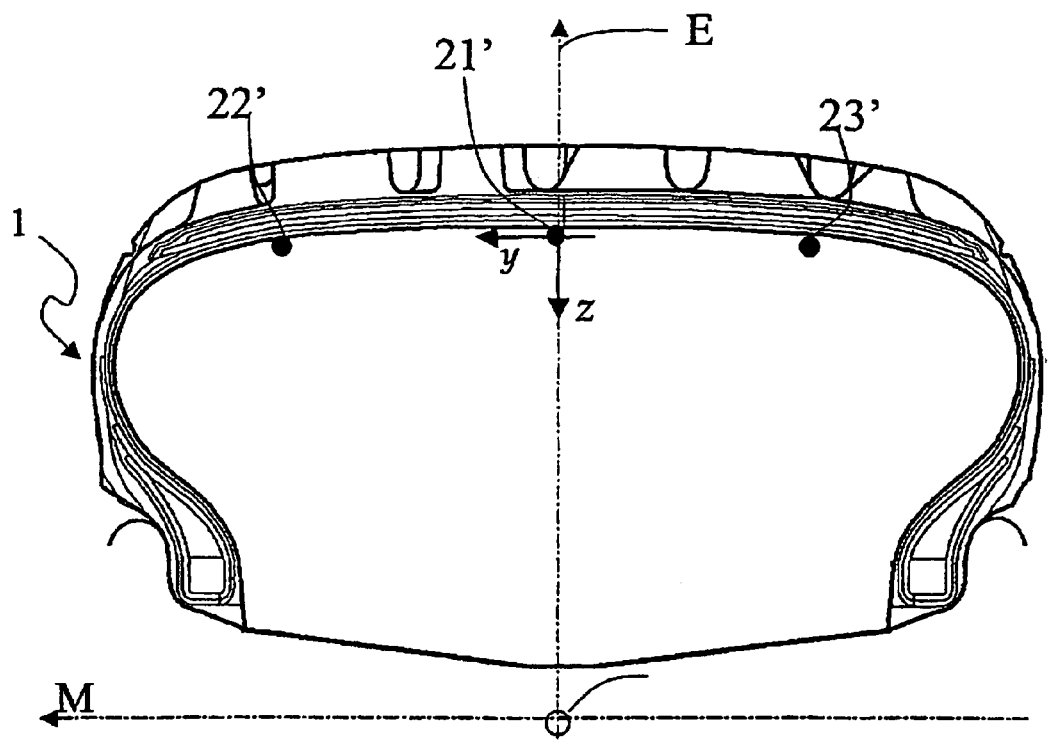
FIG. 3 shows schematically, in a side view, a rolling tyre having three sensors disposed on the liner internal surface, according to a further embodiment of the present invention.

In FIG. 3 a further embodiment of the present invention is shown. In such figure three sensors 21', 22' and 23' are associated to a tire 1.

Preferably, a first sensor 21' is disposed on the internal surface of the liner 111 in a central position along the equatorial plane E of the tire. Preferably the other two sensors 22' and 23' are disposed on the same surface each of them positioned between the central line and said sidewalls of the tire (hereinbelow they are named left shoulder sensor 22' and right shoulder sensor 23' respectively). Preferably, said sensors 21', 22' and 23' are disposed along the same meridian plane M of the tire. Said disposition allows to monitor the general behavior of the full interaction area between the tire and the road; for instance when the tyre is cornering the signals derived from the two sensors 23' and 22' change relative to each other. Other maneuvers can be detected by comparing the signal of the sensor 21', 22', 23', (e.g. in a case of an aquaplaning phenomenon).

It has to be noted that said sensors may be disposed in other points of said tire in a way to measure the variations of acceleration of said points and in a way to compare the signals derived from different sensors, if said points are key points able to give information on the behavior of said tire in motion.

Alternatively, said sensors may be associated with points of the tire located at tread level, at carcass sidewall level, or at liner level, or bead level, or with intermediate points. Moreover one of said sensors may be located on the rim of the wheel; in this case a comparison between the signal of the rim sensor and another signals derived form a sensor located on a liner surface may give an indication of the relative movement between the rim and the tire for example during a braking manoeuvre.

Figure 4:
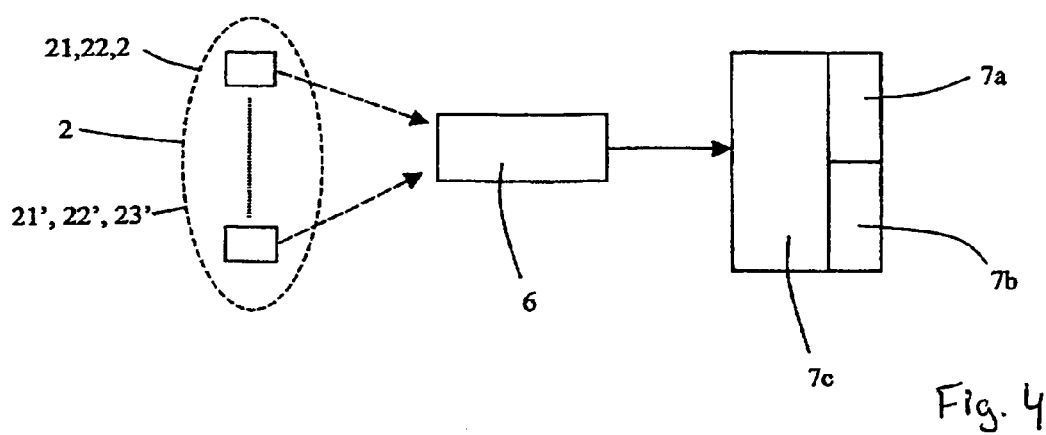
FIG. 4 shows a diagram block of an example of a system to monitoring the behaviour of a vehicle according with present invention.

In FIG. 4 is shown an example of a system to monitoring the behavior of a vehicle. In particular, FIG. 4 shows the sensors 2 or 21, 22, 23 or 21', 22' and 23', a receiving device 6 associated with said sensors and an elaboration unit 7 connected to said receiving device 6. The elaboration unit 7 comprises, for example a volatile storage element 7a, a permanent storage element 7b and processor 7c. The sensor are mounted, as stated above, at specified points of the tire, while the receiving device 6 and the elaboration unit 7 are mounted preferably on the vehicle. For example said receiving device and said elaboration unit may be part of an on-board computer of the vehicle. The receiving device 6 is, for example, an electromagnetic radio frequency receiver. Said sensors are preferably provided with a piezoelectric device or a piezoresitive device or with a silica based device in a way to generate a signal correspondent to the acceleration of the point on which they are associated. Said signal could be transmitted to said receiver 6 by means of radio wave more preferably by means of high frequency radio wave.

The inventors have observed that by measuring the acceleration of characteristic points of the carcass, during its travel, it is possible to verify whether the tyre is being subjected to braking, acceleration, or cornering, or knowing the friction available between the tire itself and the road, or when the tire is close to aquaplaning and whether or not it is in an area of instability.

Figure 5:
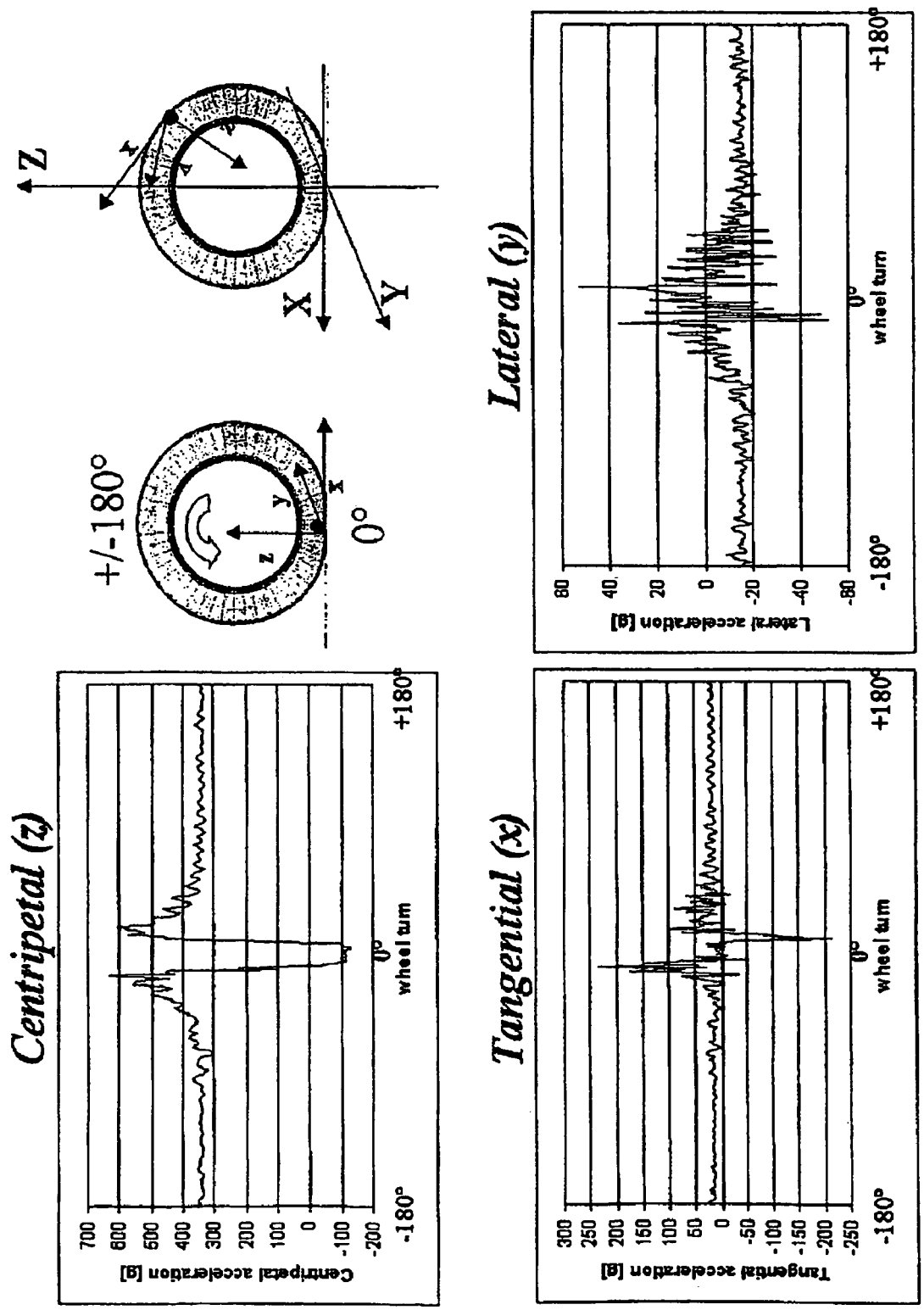
FIG. 5 shows three graphs respectively of the centripetal, tangential and lateral acceleration of a specific point of a tire which is monitored by means of the sensor of FIG. 1.

In FIG. 5 is shown three experimental graphs respectively of centripetal, tangential and lateral acceleration of a tire with a size of 205/55/R16 rolling at 80 Km/h over a drum with a diameter of 1.7 meter, measured from the sensor of FIG. 1. Said local reference frame, labeled with x, y, z, is shown in right upper corner of the figure.

Figure 6:
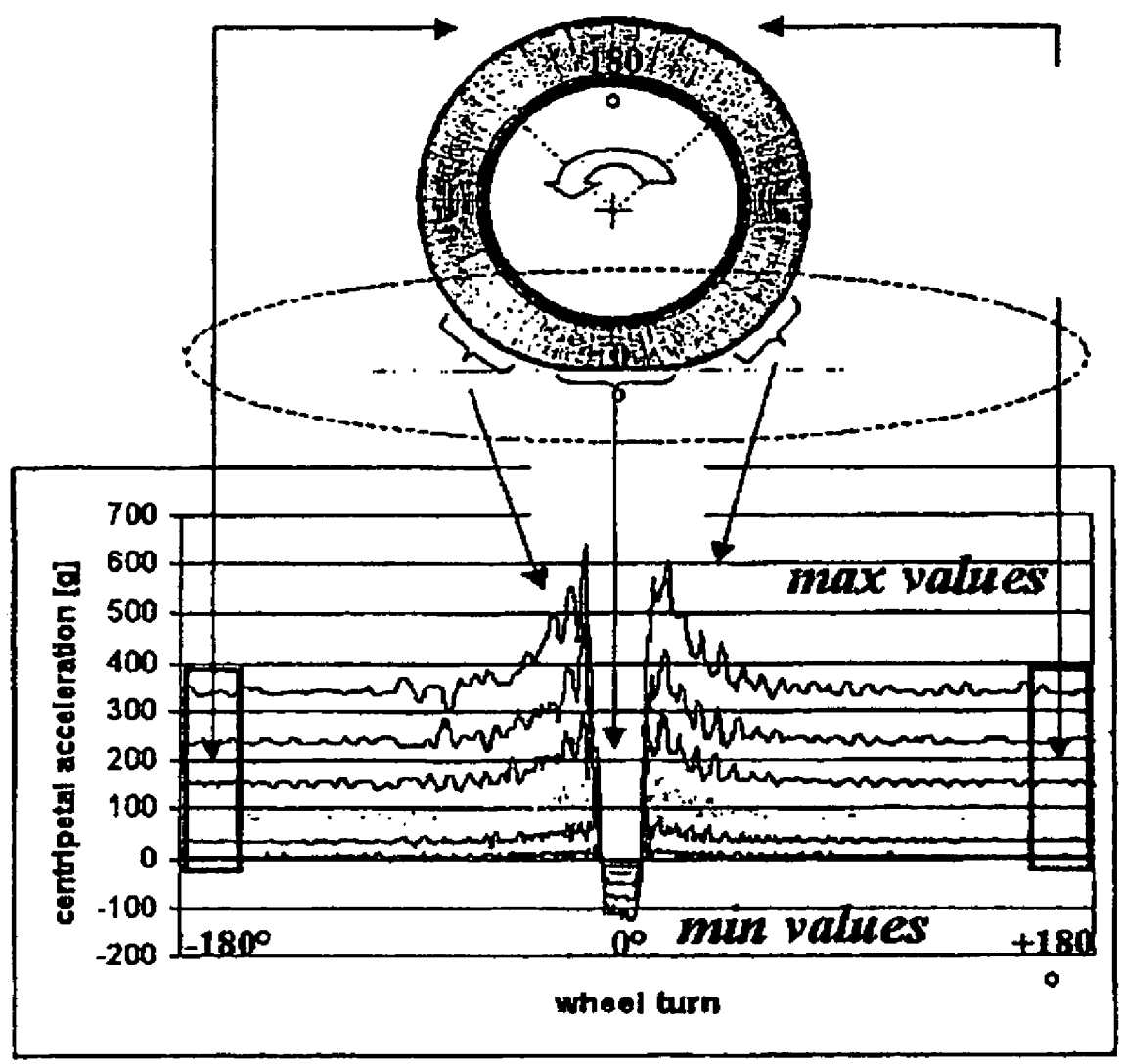
FIG. 6 shows a further graph of the centripetal acceleration of specific points of a tire which is monitored by means of the sensors of FIG. 1 in free rolling at different speeds (same load)

In FIG. 6 a further graph of the centripetal acceleration of the same tire of the FIG. 5 at different speeds and at the same load are shown. This figure shows that the curves at different speeds have the same shape but different amplitude, in particular for the peak-to-peak values.

Figure 7:
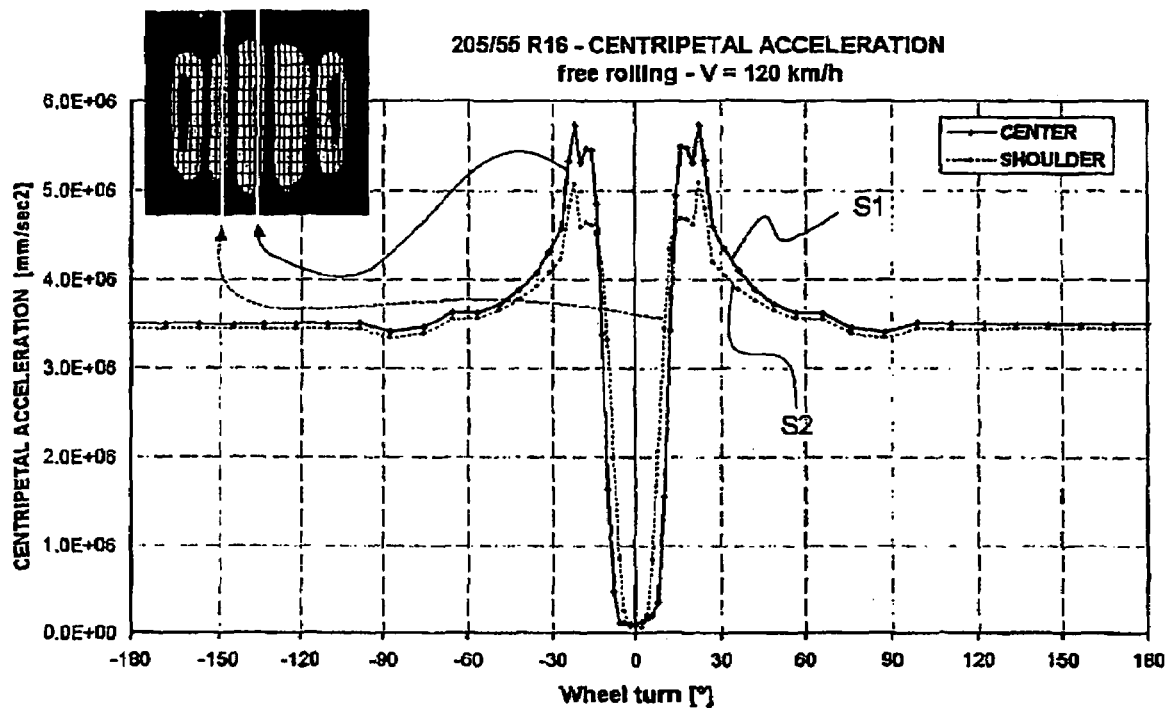
FIG. 7 shows a further graph of the centripetal acceleration of specific points of a tire, which is monitored by means of the sensors of FIG. 3.

In FIG. 7 a further graph of the acceleration of the same tire of FIG. 5 measured from the sensors of FIG. 3 is shown. In particular, in FIG. 7 two curves are shown. A first curve S1 refers to the central sensor 21' of FIG. 3, the second curve S2 refers to the left shoulder sensor 22' of FIG. 3. The conditions of motion of the tire are 4500 N of load, 2.2 bar of tire pressure, 120 Km/h of speed.

Figure 8:
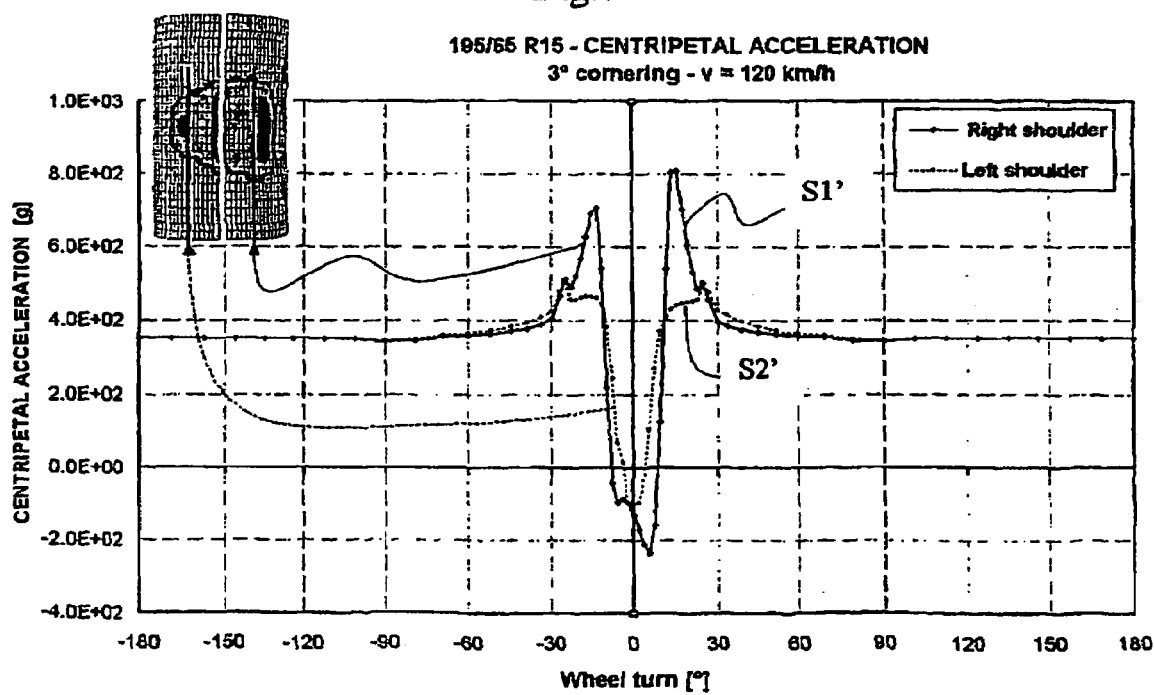
FIG. 8 shows a further graph of the centripetal acceleration of specific points of a tire, which is monitored by means of the sensors of FIG. 3 in free rolling and in cornering condition.

In FIG. 8 a further graph of the acceleration of the same tire of FIG. 5 measured from the sensors of FIG. 3 is shown. In particular, in FIG. 8 two curves are shown. A first curve S1' refers to the right shoulder sensor 23' of FIG. 3, the second curve S2' refers to the left shoulder sensor 22' of FIG. 3. Said tire is in a left cornering condition of 3° and the other conditions (speed and load) are the same of FIG. 7.

The applicant has noted that the sensor 23' (right shoulder), in a region that contains the footprint area of the tire, measures an acceleration which is greater than the acceleration measured from the sensor 22' (left shoulder). This is due to the deformation of the tire during said cornering condition. By monitoring the difference between the accelerations measured from said two sensors the system of the present invention is able to detect a critique condition during a cornering manoeuvre. For example said critique condition may be detected by comparing said difference of accelerations with a predetermined threshold value or by comparing (point to point) a curve monitored by a shoulder sensor with a reference curve stored into one of said memory elements.

According to present invention specified reference curves may be stored in said volatile storage element 7a or in the permanent storage element 7b of the elaboration unit 7, in a temporary or permanent way respectively.

Said reference curves may be during a setup phase of the system and may be generated by each of the sensors of the system.

For example, the basic reference curves, which represent, respectively, the cyclic variation, in one revolution of the tire, of the accelerations of predetermined points of the tire may be stored in the storage elements 7a or 7b. Moreover more than one reference curve may be stored in both said storage elements 7a and 7b.

The receiving device 6 receives the signals emitted by the sensors during the motion of the tire and sends them to the elaboration unit 7, which is preferably programmed to process them. Said signals are correspondent to curves of the signals amplitude in a predetermined time interval.

Each cyclic curve of centripetal or tangential or lateral acceleration is compared in the elaboration unit 7 with said basic reference curves stored, and the information on the state of instantaneous behavior of the tyre and/or on the instantaneous adhesion between the tyre and the road is obtained from the comparisons.

Example of comparisons between a basic reference curve and a monitored cyclic curve are the following:

comparision of two curves completely point by point for a entire revolution of a tire, or comparision of some characteristic peaks of one reference curve with correspondents characteristic peaks of one monitored cyclic curve, or comparision of the entire area under one reference curve with the correspondent entire area under one correspondent monitored cyclic curve, or comparision of a temporal portion of the area under one reference curve with the correspondent temporal portion of the area under one correspondent monitored cyclic curve, or comparision of a predetermined number of monitored cyclic curves with a reference curve in a way to obtain a time history of the monitored points of the tire.

Other information may be obtained by comparing signals derived from sensors associated to different tires of a vehicle. For example to monitoring a breaking of a vehicle a comparison between signal derived from the front tires and signals derived from sensors of the rear tires of the vehicle may be realized. Another example of a comparison between signals derived from sensors located in different tires of the vehicle may be accomplished during a cornering condition, in which the difference between signals derived from a tire on one side of the vehicle may be compared with signals derived from a tire on the other side of the vehicle.

Moreover, according to the present invention more than one sensor on the same tire may be associated. In this case, many comparisons of the signals derived from two different sensors of the same tire may be obtained (i.e. in the above cornering condition).

Preferably, the basic reference curves are acquired during the running of the motor vehicle on the road, in the course of each revolution of the tyre. The basic reference curves (or the values of the characteristics points) are stored temporarily to carry out the comparison with the current cyclic operating curves, acquired in at least a successive revolution of the said tyre. For example, the cyclic operating curve acquired in a revolution of the tyre is compared with a basic reference curve acquired in the preceding revolution of the tyre in the i-th preceding revolution.

Alternatively, said curves (reference curves and cyclic curves) may be stored in a memory element inside of each sensor. In such case, an elaboration unit is located inside of each sensor and the above-described comparison step of the acceleration signal is made inside of each sensor.

In order to avoid accidental mistakes in the sensor signal generation or transmission, advantageously, specified pairs or triplets of acceleration of specific points emitted by two or more sensors associated with two or more specified points of the tyre could be also processed in the elaboration unit 7.

The information obtained from said comparisons can be used subsequently to set control actions of mechanisms of the motor vehicle, for example regulation of the brake system (longitudinal behaviour and/or lateral one), or active suspension, or to give info concerning the status of the tyre (wearing situation, adhesion coefficient available, etc) and similar.

Advantageously, the accelerations of the monitored points may be integrated with other information of the vehicle, for example the speed of the vehicle and/or the tire pressure. Said other information may be measured by other sensors.

The Applicant has observed from the curves of graphs of FIG. 5-9 that, in a complete revolution of the tire, there are portions of said curves, which assume more significant value than other portions of said curves. For example, said curves assume significant values in proximity (before and after) the passage of the monitored point into the physical contact between the tire and the road: see FIG. 6 as example.

This means that the data (i.e. accelerations) derived from the sensor located in a defined point of the tire can give important info (i.e. concerning the way to approach the road interaction and the way to leave this interaction) not only when this point is close the contact area. There are other regions in which said signals derived from the sensors assume critical values, for example in the opposite side of the footprint region.

The main changes during the tire life (e.g. wear or structural modification) can be in fact found also comparing the different curves generated by the sensor signals in this region at different times (i.e. montly).

The invention claimed is:

1. A method for monitoring instantaneous behavior of a tire in a rolling condition, comprising:

acquiring and storing, at least temporarily, at least one reference curve representing an acceleration profile of at least one specified point of the tire during at least one portion of a revolution of the tire;

continuously acquiring signals of acceleration of the at least one point during the at least one portion of a revolution;

deriving from the signals of acceleration at least one cyclic curve of acceleration of the at least one point during the at least one portion of a revolution;

comparing the at least one cyclic curve with the at least one reference curve; and emitting a signal depending on the comparison;

wherein the at least one reference curve represents the acceleration profile of the at least one point in at least two directions, wherein the directions comprise two or more of a centripetal direction, a tangential direction, and a lateral direction, wherein the signals of acceleration of the at least one point in the at least two directions are continuously acquired, and wherein the emitted signal indicates the instantaneous behavior of the tire.

2. The method of claim 1, wherein comparing the at least one cyclic curve with the at least one reference curve comprises:

comparing the at least one cyclic curve with the at least one reference curve point-by-point for an entire revolution of the tire.

3. The method of claim 1, wherein comparing the at least one cyclic curve with the at least one reference curve comprises:

comparing a cyclic curve derived from a first point on the tire with a reference curve derived from a second point on the tire.

4. The method of claim 3, wherein the first point is located on a liner surface along an equatorial plane of the tire, wherein the second point is located on the liner surface on a shoulder of the tire, and wherein the first and second points are located along a same meridian plane of the tire.

5. The method of claim 3, wherein the first point is located on a liner surface on a first shoulder of the tire, wherein the second point is located on the liner surface on an opposite shoulder of the tire, and wherein the first and second points are located along a same meridian plane of the tire.

6. The method of claim 3, wherein the first point is located on a liner surface along an equatorial plane of the tire, and
wherein the second point is located on the liner surface along the equatorial plane of the tire, and
wherein the first point is a predetermined arc distance from the second point.

7. The method of claim 1, wherein comparing the at least one cyclic curve with the at least one reference curve comprises:
comparing characteristic peaks of the at least one cyclic curve with corresponding characteristic peaks of the at least one reference curve.

8. The method of claim 1, wherein comparing the at least one cyclic curve with the at least one reference curve comprises:
comparing a portion of an area under the at least one cyclic curve with a corresponding portion of an area under the at least one reference curve.

9. A system for monitoring instantaneous behavior of a tire in a rolling condition, comprising:
at least one memory element for acquiring and storing, at least temporarily, at least one reference curve representing an acceleration profile of at least one specified point of the tire during at least one portion of a revolution of the tire;
at least one sensor associated with the at least one point for emitting, over a period of time, signals of acceleration of the at least one point;
a receiving device for continuously acquiring the signals of acceleration of the at least one point during the at least one portion of a revolution; and
an elaboration unit incorporating a program for determining from the signals of acceleration at least one cyclic curve of acceleration of the at least one point during the at least one portion of a revolution;
wherein the elaboration unit continuously compares the at least one cyclic curve with the at least one reference curve,
wherein the elaboration unit emits a signal depending on the comparison,
wherein the at least one reference curve represents the acceleration profile of the at least one point in at least two directions,
wherein the directions comprise two or more of a centripetal direction, a tangential direction, and a lateral direction,
wherein the signals of acceleration of the at least one point in the at least two directions are emitted, and
wherein the emitted signal depending on the comparison indicates the instantaneous behavior of the tire.

10. The system of claim 9, wherein a first sensor is located on a liner surface along an equatorial plane of the tire,
wherein a second sensor is located on the liner surface on a shoulder of the tire, and
wherein the first and second sensors are located along a same meridian plane of the tire.

11. The system of claim 9, wherein a first sensor is located on a liner surface on a first shoulder of the tire,
wherein a second sensor is located on the liner surface on an opposite shoulder of the tire, and
wherein the first and second sensors are located along a same meridian plane of the tire.

12. The system of claim 9, wherein a first sensor is located on a liner surface along an equatorial plane of the tire, and
wherein a second sensor is located on the liner surface along the equatorial plane of the tire, and
wherein the first sensor is a first predetermined arc distance from the second sensor.

13. The system of claim 12, further comprising:
a third sensor located on the liner surface along the equatorial plane of the tire;
wherein the second sensor is a second predetermined arc distance from the third sensor.

14. The system of claim 13, wherein the first, second, and third sensors are equidistant from each other.

15. The system of claim 10, further comprising:
a third sensor located on the liner surface on an opposite shoulder of the tire;
wherein the first, second, and third sensors are located along the same meridian plane of the tire.

16. The system of claim 9, further comprising a speed sensor of the tire.

17. The system of claim 9, further comprising a pressure sensor of the tire.

18. A pneumatic tire, comprising:
at least one sensor associated with at least one specified point of the tire;
wherein the at least one sensor emits, over a period of time, a signal representing an acceleration profile of the at least one point of the tire during at least one portion of a revolution of the tire,
wherein the signal represents the acceleration profile in at least two directions, and
wherein the directions comprise two or more of a centripetal direction, a tangential direction, and a lateral direction.

19. The method of claim 1, wherein the at least one reference curve represents an acceleration profile of at least one specified point of the tire as a function of position of the at least one point during at least one portion of a revolution of the tire.

20. The pneumatic tire of claim 18, wherein the signal represents an acceleration profile of the at least one point of the tire as a function of position of the at least one point during at least one portion of a revolution of the tire.

21. The pneumatic tire of claim 18, wherein a first sensor is located on a liner surface along an equatorial plane of the tire,
wherein a second sensor is located on the liner surface on a shoulder of the tire, and
wherein the first and second sensors are located along a same meridian plane of the tire.

22. The pneumatic tire of claim 18, wherein a first sensor is located on a liner surface on a first shoulder of the tire
wherein a second sensor is located on the liner surface on an opposite shoulder of the tire, and
wherein the first and second sensors are located along a same meridian plane of the tire.

23. The pneumatic tire of claim 18, wherein a first sensor is located on a liner surface along an equatorial plane of the tire,
wherein a second sensor is located on the liner surface along the equatorial plane of the tire, and
wherein the first sensor is a first predetermined arc distance from the second sensor.

24. The pneumatic tire of claim 23, further comprising a third sensor located on the liner surface along the equatorial plane of the tire,
wherein the second sensor is a second predetermined arc distance from the third sensor.

25. The pneumatic tire of claim 24, wherein the first, second, and third sensors are equidistant from one another.

26. The pneumatic tire of claim 21, further comprising a third sensor located on the liner surface on an opposite shoulder of the tire,
   wherein the first, second, and third sensors are located along the same meridian plane of the tire.

27. The pneumatic tire of claim 18, further comprising a sensor configured to output a signal indicative tire speed.

28. The tire of claim 18, further comprising a sensor configured to output a signal indicative of tire pressure.

* * * * *